United States Patent Office 3,560,438
Patented Feb. 2, 1971

3,560,438
PREPARATION OF POLYBENZOXAZOLES AND POLYBENZTHIAZOLES
Charles D. Burton and Norman L. Madison, Midland, Mich., assignors to The Dow Chemical Company, Midland, Mich.
No Drawing. Filed May 8, 1968, Ser. No. 727,737
Int. Cl. C08g 33/02
U.S. Cl. 260—47                    5 Claims

ABSTRACT OF THE DISCLOSURE

The present invention relates to heterocyclic polymers prepared by reacting 3,3'-dihydroxybenzidine or 3,3'-dimercaptobenzidine with a dialkyl or diaryl imidate or thioimidate compound in the presence of an acid reaction promoter and an inert carrier liquid.

SUMMARY OF THE INVENTION

The invention herein described was made in the course of or under a contract or subcontract thereunder, with the Department of the Air Force.

The present invention is to new and useful bibenzoxazole and bibenzothiazole polymers having recurring monomeric units corresponding to the formula

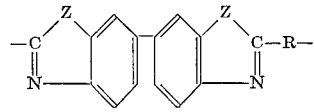

where Z is either —S— or —O—, R is a member selected from the group consisting of $(CX_2)_k$,

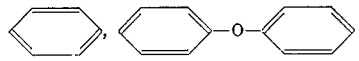

$(CF_2)_m$ or $[(CF_2)_nO(CF_2)_{n'}]_y$ where X is either H or F, $k$ is an integer ranging from 1 to about 12, $m$ is an integer ranging from 2 to about 30, $n$ and $n'$ are integers ranging from 1 to about 6, and $y$ is an integer ranging from 1 to about 4.

These polymers ordinarily are prepared by reacting 3,3'-dihydroxybenzidine or 3,3'-dimercaptobenzidine with a dialkyl or diaryl imidate compound having the formula

or corresponding thioimidate compound of formula

where $R_1$ and $R_2$ are members selected from the group consisting of aliphatic groups containing from 1 to about 4 carbon atoms or phenyl or mixtures thereof and R is the same as set forth directly hereinbefore.

The process is carried out in an inert solvent or carrier liquid in the presence of an aliphatic carboxylic or halogenated aliphatic carboxylic acid having from 1 to about 6 carbon atoms, and preferably from 2 to about 4 carbon atoms, as a reaction promoter.

The polymer is recovered and separated from the reaction mixture and dried.

Alternatively, dihydroxybenzidine can be acylated with the acid chloride of a perfluorinated dibasic acid and this intermediate product can be heated in the presence of a dehydrating agent, e.g. phosphorus pentoxide or polyphosphoric acid, to effect dehydration and cyclization thereby to prepare the novel polymers of the present invention.

The polymers can be formed into flexible films or drawn into fibers. Also certain embodiments are suitable for use as elastomers. The novel polymer products of the present invention are stable in air at high temperatures, i.e. greater than 250° C., thus providing unexpected utility in high temperature applications not possible with a large number of conventional film forming or fiber forming polymers. The present novel polymers consistently have an inherent viscosity greater than 0.5 and products with an inherent viscosity greater than about 0.85 readily can be prepared.

The polymers of the present invention are suitable for use as films for high temperature applications, as coatings and separators in high temperature electrical assemblies, or as fibers for use in high temperature applications.

DESCRIPTION OF PREFERRED EMBODIMENTS

In one preferred embodiment of the present invention, usually about equivalent quantities, i.e. equimolar, of the dihydroxybenzidine or dimercaptobenzidine and a dimethylperfluoroalkylimidate or a dimethylperfluoroalkoxadiimidate corresponding to the formula

or corresponding dimethylperfluoroalkylthioimidate where $R_4$ is either $(CF_2)_x$ or $[CF_2CF_2OCF_2CF_2]_p$ and $x$ is an integer ranging from 2 to about 10 and $p$ is an integer ranging from 1 to about 4, are reacted in the presence of an inert solvent or carrier liquid using high purity glacial acetic acid as a reaction promoter.

The reaction mass is agitated while being maintained at a temperature of from about room temperature (i.e. ~15°–20° C.) to about 70° C., usually at from about 40 to about 60° C., for a period of from about 2 to about 168 hours, ordinarily from about 24 to about 72 hours or more.

The bibenzoxazole or bibenzthiazole polymer product is recovered from the reaction mixture, generally by filtering to remove solid by-products and precipitating the polymer by pouring the residual filtrate into a precipitant for the polymer. In some instances, the polymer as prepared precipitates directly in the reaction mixture. In these instances, it is recovered directly from the reaction mass.

The so-recovered product usually is washed and dried.

Usually about stoichiometric quantities (i.e. 1:1 molar equivalents) of the dihydroxybenzidine or dimercaptobenzidine and imidate reactants are employed as these quantities have been found to provide products having the highest molecular weights. However, polymers can be prepared if either reactant is employed in excess of stoichiometric.

The aliphatic carboxylic acid reaction promoter at a minimum should be present in an equivalent quantity equal to that of the imidate reactant, i.e. about 2 gram moles per gram mole of the imidate.

Solvents or carrier liquids suitable for use in preparing the present novel compound can be selected from any of a wide variety of liquids including, for example (1) organic polar aprotic materials such as aliphatic ethers exemplified by diethylene glycol dimethyl ether, ethylene glycol dimethyl ether and dioxane, (2) polar protic solvents such as the fluoroinated alcohols, e.g. hexafluoroisopropanol, and (3) halogenated hydrocarbon such as carbon tetrachloride, chloroform, methylene chloride and the like. The selection of a given liquid is not critical so long as it exhibits a solubility for at least a portion of the reactants and is inert to or does not detrimentally react with the reactants and product compound. Hexafluoroisopropanol has been found to be particularly suitable.

The quantity of solvent or carrier to be employed is not critical. However, with the preferred hexafluoroisopropanol solvent, at solvent to polymer product proportions of at least 14 ml. solvent/1 gram product the extent of polmerization is increased over that realized at lower solvent/product proportions. To illustrate, with hexafluoroisopropanol as solvent in the preparation of perfluorosebacimidate-dihydroxybenzidine copolymers, at a solvent to polymer proportion of 14 ml./gram, a polymer inherent viscosity of greater than 0.85 was obtained while with a solvent-polymer ratio of 7.4 ml./gram the inherent viscosity of the product was about 0.58.

For the optimum of product purity and yield and the production of polymers of higher molecular weight, e.g. greater than 18,000, high purity substantially anhydrous reactants, acid reaction promoter and solvent or carrier liquid should be employed. Conveniently, the imidates, acid promoter and solvent are purified by distillation prior to use.

Generally, an inert atmosphere, e.g. substantially anhydrous nitrogen, is employed in the preparation of the compound. This assures optimum in purity and product yield.

The following example will serve to further illustrate the present invention but is not meant to limit it thereto.

EXAMPLE

The preparation of several bibenzoxazole and bibenzthiazole polymers was carried out using a flat bottomed cylindrical glass tube containing a magnetic stirrer and having a capacity of about 160 cubic centimeters as a reactor. This tube reactor was tapered at the top and welded to an 8-inch small bore condenser fitted with a female 14/20 standard taper joint at the top. A pressure equallized addition funnel with a Teflon fluorocarbon stopcock and male and female 14/35 standard taper joints at either end was joined to the top of the condenser by means of a Teflon fluorocarbon sleeve. The top of the addition tube was connected by standard tapered joints having Teflon fluorocarbon sleeves through a gas bubbler to a source of dry nitrogen. No lubricants or greases were used in the assembly.

(a) Preparation of perfluorosebacimidate-dihydroxybenzidine copolymer

Purified dihydroxybenzidine,

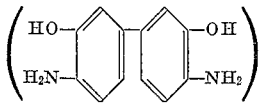

1.45 grams (∼0.007 gram mole), was charged to the reactor in a dry box. Distilled dimethyl perfluorosebacimidate

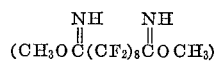

3.47 grams, (∼0.007 gram mole) and high purity glacial acetic acid, 0.8 milliliter, (∼0.014 gram mole) were charged to the addition funnel which was maintained under a substantially anhydrous nitrogen atmosphere. The reactor and addition funnel were transferred to a hood and assembled into an integral unit while maintaining the nitrogen atmosphere. About 40 milliliters of substantially anhydrous distilled hexafluoroisopropanol was added by syringe to the reactor; about 10 milliliters of the same material was added in similar manner to the addition funnel.

The contents of the addition funnel were added dropwise stirring to the reactor over a period of about 5 minutes. This produced a white slurry. The funnel and condenser were washed down with two 5 milliliter portions of hexafluoroisopropanol.

The resulting reaction mixture was heated with agitation to reflux (∼59° C.) by means of an oil bath. After about 50 hours under total reflux, the dihydroxybenzidine had dissolved leaving a clear amber solution. The reaction mixture was maintained at the reflux temperature for seven days. After this period, the resulting mass was cooled to about 25° C., the solution pressure-filtered through a glass frit and a product precipitated by pouring the resulting filtrate into 300 milliliters of stirred methanol.

The white polymeric product was isolated by vacuum filtration and washed with methanol and water. The product was dried at 50° C. under a low absolute pressure. The resulting dried polymer was heated to 205° C. under an absolute pressure of about 1 micron mercury for two hours to remove any traces of ammonium acetate.

Elemental chemical analysis of the product gave C, 41.55%; H, 1.07%; F, 46.2%; N, 5.07%.

Theoretical analysis for a copolymer having a monomeric unit of formula

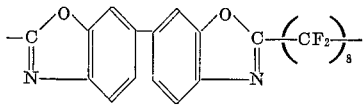

is C, 41.7%; H, 0.95%; F, 47.9%; N, 4.4%.

The polymer softened into a viscous melt at 240° C. but did not become a free-flowing melt until a temperature of about 310° C.

The product had an inherent viscosity of 0.856 (hexafluoroisopropanol at 25° C.).

The melt viscosity was 2,140,000 poises at 250° C. indicating a molecular weight of greater than 18,000.

Differential thermal analysis indicated crystalline melting at 235° C. with no other deflections up to 365° C. From 365° C. to 445° C. there was a gradual exotherm after which the curve gradually returned to the base line. No glass transition point was detected in the temperature range examined.

A portion of the product was heated above about 245° C. and pressed into a clear, tough film. A second portion when similarly heated was drawn into clear, long tough fibers.

Transparent films were cast from a hexafluoroisopropanol solution using conventional film forming techniques. A sample of the resulting film was heated at 200° C. for 21 hours. After this time the film was still tough and flexible. The infrared spectrum of the film showed absorbency as follows:

| Wave length μ | Wave length μ |
|---|---|
| 6.30 (sharp peak) | 8.26–89 (broad band) |
| 6.42 (sharp peak) | 9.85–9.95 (band) |
| 6.90 (sharp peak) | 10.45 (narrow band) |
| 7.10 (sharp peak) | 11.35 (narrow band) |
| 7.50 (narrow band) | 12.35 (narrow band) |
| 7.70 (narrow band) | |

When this study is repeated using the corresponding dimethylperfluorosebacothioimidate,

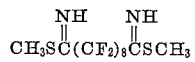

as reactant, a bibenzoxazole polymer having substantially identical properties to those exhibited by the polymer described directly hereinbefore is obtained.

(b) Preparation of perfluoroadipimidate-dihydroxybenzidine copolymer

Following the same procedure as described for preparation (a), about 1.76 grams of dihydroxybenzidine, 2.56 grams of dimethylperfluoroadipimidate,

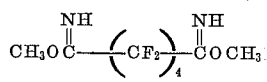

1 milliliter of glacial acetic acid and 50 milliliters of hexafluoroisopropanol were reacted. During this preparation, a slurry remained through the reaction period since the polymer product was not soluble in the hexafluoroisopropanol carrier liquid.

Elemental analysis of the white polymeric product showed C, 49.9%; H, 1.35%; F, 34.7%; N, 6.59%.

Theoretical analysis for a polymer having a monomeric unit corresponding to the formula

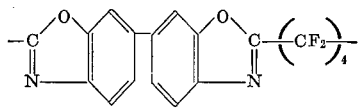

is C, 49.7%; H, 1.38%; F, 35.1%; N, 6.45%.

The polymeric product softened at about 260° C.

The product was substantially insoluble in hexafluoroisopropanol; therefore, no molecular weight determination was made.

(c) Preparation of perfluoro-4,9,14,19-tetraoxadocosane-diimidate-dihydroxybenzidine copolymer About 3.4 grams of the tetramer nitrile, $$NC[CF_2CF_2OCF_2CF_2]_4CN$$

was charged to a 3-ounce Fischer-Porter tube reactor under a substantially anhydrous nitrogen atmosphere. While maintaining the nitrogen atmosphere, about 20 milliliters of redistilled, substantially anhydrous methanol was syringed into the reactor. The tube was cooled in ice and about 0.5 milliliter of substantially anhydrous triethylamine added by syringe thereto. This gave a two-phase system. The reactor tube was closed and warmed to room temperature while agitating the reaction mixture. The original two-phase system became a homogeneous solution within 30 minutes but agitation was continued overnight.

The resulting product mass was heated under a low pressure to distill any unreacted triethylamine and excess methanol therefrom, the last traces of these components being removed by pumping under a pressure of about 1 micron mercury absolute.

The cloudy, yellow product was filtered and gave the clear yellow liquid product, methyl perfluoro-4,9,14,19-tetraoxadocosanediimidate, in about 85% yield, 3.1 grams. Product loss was primarily caused by holdup in the reactor.

The infrared spectrum supported the assigned structure. No nitrile was indicated to be present.

Using the same reactor and general procedure as described in run (a), about 0.68 gram (~0.003 gram mole) of dihydroxybenzidine and 40 milliliters of substantially anhydrous hexafluoroisopropanol were placed in the reactor while about 3.1 grams (~0.003 gram mole) of the methyl perfluoro-4,9,14,19-tetraoxadocosanediimidate,

0.39 milliliter (~0.007 gram mole) of high purity glacial acetic acid and 10 milliliters of substantially anhydrous hexafluoroisopropanol were charged to the addition funnel.

The contents of the addition funnel were added to the reactor in a dropwise manner over a five minute period whereupon a white slurry formed. The funnel and condenser were washed down with 10 milliliters of hexafluoroisopropanol and the reaction heated to reflux. After about 48 hours the white slurry had become a yellow homogeneous solution; the reflux was continued for a total of 7 days.

The polymer product was recovered by stripping off the solvent and purified in the same manner as set forth for run (a). The polymer was a dark elastomeric material.

Elemental analysis gave C, 32.65%; H, 0.55%; F, 54.3%; N, 3.47%.

Theoretical analysis for a polymer having a monomeric unit corresponding to the formula

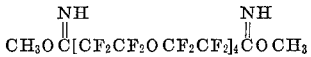

is C, 32.8%; H, 0.55%; F, 55.4%; N, 2.55%.

(d) Preparation of perfluoroadipimidate-dimercaptobenzidine copolymer

Following the same general procedure and employing the same reactor assembly as described for preparation (a), about 2.0 grams of dimercaptobenzidine was dissolved in 50 milliliters of dimethyl acetamide carrier liquid contained in the reactor. About 2.56 grams of dimethyl perfluoroadipimidate was added to about 0.97 gram of high purity glacial acetic acid and this mixture charged to the addition tube of the reactor assembly. Under a substantially anhydrous nitrogen atmosphere and with continuous agitation, the mixture in the addition funnel was slowly added to the reactor and the resulting reaction mass heated to about 50° C. for 1 hour. The process temperature was then raised to about 103° C. and the reaction mixture maintained at this temperature for about 20 hours.

Following the reaction period, the product mixture was transferred to a still and carrier liquid removed by distilling at a temperature of from about 32 to about 36° C. at an absolute pressure of about 2 millimeters mercury.

The residual material was dissolved in acetone and filtered to remove a small amount of solids which was subsequently identified as dimercaptobenzidine disulfide. The acetone was evaporated from the product solution and the resulting polymer product dried in an oven at a low absolute pressure and 50° C. temperature for a period of about 18 hours. The resulting dried product was an elastomeric, black polymeric solid.

Elemental chemical analysis gave C, 43.23%; H, 3.32%; F, 28.7%; N, 8.65%; S, 9.76%.

Theoretical elemental analysis for a polymer having a monomeric unit corresponding to the formula

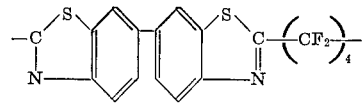

is C, 46.4%; H, 1.29%; F, 32.6%; N, 6.02%; S, 13.75%.

In a manner similar to that set forth for the preceding polymer preparations, other bibenzoxazole polymers can be prepared by reacting 3,3'-dihydroxybenzidine or 3,3'-dimercaptobenzidine with

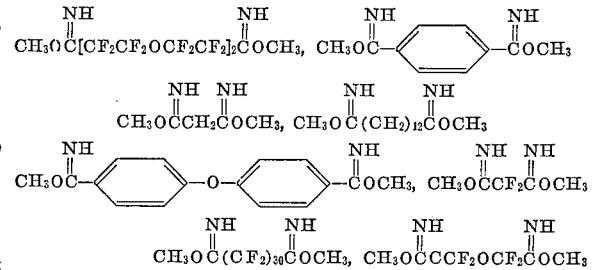

and the like or other dialkyl imidates as disclosed herein.

Various modifications can be made in the present invention without departing from the spirit or scope thereof for it is understood that we limit ourselves only as defined in the appended claims.

We claim:

1. In a process for preparing a polymer by reacting in a carrier liquid a member selected from the group consisting of 3,3'-dihydroxybenzidine or 3,3'-dimercaptobenzidine and an imidate compound selected from the group consisting of alkyl and aryl imidates or thioimidates having the formula

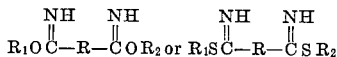

wherein R is a member selected from the group consisting of $(CX_2)_k$,

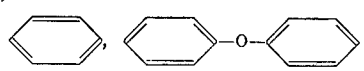

$(CF_2)_m$ or $[(CF_2)_nO(CF_2)_{n'}]_y$ where X is a member selected from the group consisting of H or F, where $k$ is an integer ranging from 1 to about 12, $m$ is an integer ranging from 2 to about 30, $n$ and $n'$ are integers ranging from 1 to about 6 and $y$ is an integer ranging from 1 to about 4 with $R_1$ and $R_2$ being members selected from the group consisting of aliphatic groups containing from 1 to about 4 carbon atoms or phenyl; the improvement which consists of:

(a) Carrying out the reaction at a maximum temperature of about 70° C. for a period of from about 2 to about 168 hours, and (b) Introducing a reaction promoter into the reaction mass, said reaction promoter being a member selected from the group consisting of aliphatic carboxylic acids and halogenated aliphatic carboxylic acids having from 1 to about 6 carbon atoms and being introduced in an amount sufficient to provide a minimum of about 2 gram moles of carboxylic acid per gram mole of said imidate compound.

2. The process as defined in claim 1 wherein the imidate compound is a dimethyl imidate having the formula

wherein $R_4$ is a member selected from the group consisting of $(CF_2)_x$ or $[CF_2CF_2OCF_2CF_2]_p$ where $x$ is an integer ranging from 2 to about 10 and $p$ is an integer ranging from 1 to about 4, and employing the benzidine reactant and imidate compound in about stoichiometric quantities.

3. The process as defined in claim 2 wherein the carrier liquid is hexafluoroisopropanol.

4. The process as defined in claim 2 wherein the process is carried out under an inert atmosphere.

5. The process as defined in claim 2 wherein high purity glacial acetic acid is used as the acid reaction promoter.

References Cited

UNITED STATES PATENTS

| | | | |
|---|---|---|---|
| 2,570,180 | 10/1951 | Allewelt | 260—78 |
| 3,268,545 | 8/1966 | Litt et al. | 260—307 |
| 3,306,876 | 2/1967 | Kantor et al. | 260—47 |
| 3,322,723 | 5/1967 | Angelo | 260—47 |

OTHER REFERENCES

Mulvaney et al., J. Org. Chem. 26, 95–97 (1961).

Imai et al., Makromol. Chem. 83, 167–76 (1965).

Hergenrother et al., J. Polymer Sci. 3A, 1665–74 (1965).

Trischler et al., J. Appl. Polym. Sci. 11, 1325–31 (1967).

Korshak et al., Vysokomolekul. Soedin. 8, 1599 (1966). Chem. Abstr. Supplied.

WILLIAM H. SHORT, Primary Examiner

M. GOLDSTEIN, Assistant Examiner

U.S. Cl. X.R.

260—79